United States Patent
Russ et al.

(10) Patent No.: US 7,057,618 B2
(45) Date of Patent: Jun. 6, 2006

(54) PATCH PICKING METHODS AND APPARATUS

(75) Inventors: Robert Russ, Richmond, CA (US); Karon A. Weber, San Francisco, CA (US); Maxwell O. Drukman, San Francisco, CA (US); Tom Hahn, Piedmont, CA (US); Marco da Silva, Oakland, CA (US); Christopher King, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 10/846,493

(22) Filed: May 14, 2004

(65) Prior Publication Data
US 2005/0253846 A1 Nov. 17, 2005

(51) Int. Cl.
*G06T 13/00* (2006.01)

(52) U.S. Cl. .................. 345/473; 345/420; 345/428; 345/440; 345/160; 345/168; 345/520; 715/865

(58) Field of Classification Search ............... 345/428, 345/420, 642, 473, 440, 160, 168, 520; 715/865
See application file for complete search history.

(56) References Cited

U.S. PATENT DOCUMENTS

| | | | | |
|---|---|---|---|---|
| 5,359,703 A | * | 10/1994 | Robertson et al. | 345/419 |
| 5,731,821 A | * | 3/1998 | Girard | 345/474 |
| 6,144,385 A | * | 11/2000 | Girard | 345/424 |
| 6,545,682 B1 | * | 4/2003 | Ventrella et al. | 345/473 |
| 6,606,105 B1 | * | 8/2003 | Quartetti | 715/853 |
| 6,825,839 B1 | * | 11/2004 | Huang et al. | 345/423 |
| 2005/0041014 A1 | * | 2/2005 | Slotznick | 345/156 |

* cited by examiner

Primary Examiner—Kimbinh T. Nguyen
(74) Attorney, Agent, or Firm—Townsend and Townsend and Crew LLP

(57) ABSTRACT

A computer program product for a computer system includes code that directs a processor to display a two-dimensional representation of a three-dimensional object on a display, wherein the two-dimensional representation comprises a plurality of two-dimensional regions, wherein the three-dimensional object is associated with a plurality of components in a component hierarchy, and wherein each two-dimensional region is associated with at least one component from the plurality of components, code that directs the processor to receive a selection of a two-dimensional region from the user on the display, code that directs the processor to determine a component from the plurality of components associated with the two-dimensional region, code that directs the processor to receive a value for an animation variable associated with the component, and code that directs the processor to set the animation variable associated with the component to the value, wherein the codes reside on a tangible media.

20 Claims, 10 Drawing Sheets

EYES TRACKING CURSOR

PATCH PICKING METHODS AND APPARATUS

CROSS-REFERENCES TO RELATED APPLICATIONS

The present invention is related to and incorporates by reference for all purposes U.S. patent application Ser. No. 10/846155, filed May 14, 2004, titled Pickwalking Methods and Apparatus.

BACKGROUND OF THE INVENTION

The present invention relates to computer animation. More specifically, the present invention relates to enhanced user interfaces for object animation.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar, dba Pixar Animation Studios. Over the years, Pixar developed and offered both computing platforms specially designed for CAA, and Academy-Award® winning rendering software known as RenderMan®.

Over the years, Pixar has also developed software products and software environments for internal use allowing users (modelers) to easily define object rigs and allowing users (animators) to easily animate the object rigs. Based upon such real-world experience, the inventors of the present invention have determined that additional features could be provided to such products and environments to facilitate the object definition and animation process.

Traditionally, three-dimensional objects are a collection of three-dimensional objects (components) connected in a manner defined by the modelers. More specifically, these components are connected in a manner specified by an object hierarchy. As an example, FIG. 1A illustrates a representation 100 of a typical object connection hierarchy. In this example, the hips 110 are defined as the root component, with three branches (children), as shown: torso 120, left leg 130, and right leg 140. In turn, torso 120 has a single branch to the chest 150, and chest 150 has three sub-branches, neck 160, left shoulder 170, and right shoulder 180. In turn, each of these three branches includes child nodes. As shown, right shoulder 180 and left shoulder 170 are coupled via chest 150. Previously, the object hierarchy were provided to animators for use in the animation process.

Additionally, various methods were used to allow a user to select a three-dimensional component. One method was via a textual menu or list of the three-dimensional components presented to the user. From the textual list, the user could use a pointing device to point to the name of the component. Another method was via direct selection of a control point associated with the three-dimensional component. For example, the user could graphically select a control point associated with the three-dimensional component on a display with a pointing device. The control point was typically a point on the "skeleton" (e.g. wire-frame, armature) of the three-dimensional component or a point apart from the three-dimensional component.

The inventors have recognized that drawbacks to the above methods include that selection of the control point is often very difficult. One drawback is that because three-dimensional components are represented by individual control points on the display, visually, it is difficult to determine which control points map to which components. Another drawback is that it forces the user to "hunt for pixels" on the display to find the component in interest.

FIG. 1B illustrates the problems above when the three-dimensional object is positioned such that control points and "skeletons" of the three-dimensional components visually overlap on the display. In this example, a portion 105 of a three-dimensional object is shown. In this example, the object represents a side view of a simple person clapping their hands. In FIG. 1B, portion 105 includes an armature 185 that corresponds to the component hierarchy illustrated in FIG. 1A. As can be seen, portions of armature 185 visually overlap on the display. In this example, if the user wants to select the left arm component, but not the right arm component, must first decipher the overlapping objects to determine which control point is the correct one to select. Then the user must carefully click on control point 190 and not on control points 195 or 197. As another example, if the user wants to select a ring finger on the right hand, that task is almost virtually impossible from this view.

In light of the above, the inventors of the present invention have determined that improved user interfaces and methods are desired.

BRIEF SUMMARY OF THE INVENTION

The present invention relates to computer animation. More specifically, the present invention relates to enhanced user interfaces for object manipulation environments.

The present embodiments disclose apparatus, methods and user interfaces for allowing users to more easily select components of the three-dimensional object. Embodiments allow a user to define a mapping between particular components of the object and grouping of components. In various embodiments, a representation of a three-dimensional object in a given pose is rendered and displayed on a display. Next, groupings of components are highlighted on the display to the user, as the user moves a cursor on the display over the representation. When a representation of a group of components are highlighted and selected by the user, the particular component is selected.

In various embodiments, the user may navigate around a component interconnection hierarchy to select different components via keyboard arrow keys, or the like. Subsequently, animation variables of the selected component may be manipulated using conventional techniques. The process described above may then be repeated after the animation variables of the component are updated.

According to one aspect of the invention, a method for a computer system is disclosed. One technique includes displaying a two-dimensional representation of a three-dimensional object on the display; wherein the three-dimensional object comprises a plurality of components in a component hierarchy, wherein the two-dimensional representation comprises a plurality of two-dimensional regions including a first region, a second region, and a third region, and a fourth region, wherein a fourth region comprises the second region and the third region, wherein the first region comprises a two-dimensional representation of a first component from the plurality of components, wherein the second region comprises a two-dimensional representation of a second component from the plurality of components, and wherein the third region comprises a two-dimensional representation of a third component from the plurality of components. A process may also include receiving a graphical selection of the fourth region by the user on the display, selecting the second component from the plurality of components in response to the graphical selection of the fourth region, and receiving a value for an animation variable associated with the second component from the user. Other method may include modifying the animation variable of the second component in response to the value, modifying the second region to form an updated second region, and displaying an updated two-dimensional representation of the three-dimensional object on the display; wherein the updated two-dimensional representation includes the updated second region.

According to one aspect of the invention, an animation system is disclosed. One system includes include a memory configured to store a model of a three-dimensional object, wherein the first three-dimensional object comprises a plurality of interconnected components as specified in a component hierarchy, and wherein the plurality of interconnected components includes a first component, a second component, and a third component. Various apparatus may include a display configured to display a two-dimensional representation of the three-dimensional object, wherein the two-dimensional representation comprises a plurality of two-dimensional regions including a first region, a second region, and a third region, and a fourth region, wherein a fourth region comprises the second region and the third region, wherein the first region comprises a two-dimensional representation of a first component from the plurality of interconnected components, wherein the second region comprises a two-dimensional representation of a second component from the plurality of interconnected components, and wherein the third region comprises a two-dimensional representation of a third component from the plurality of interconnected components. A device may also include a processor coupled to the memory, wherein the processor is configured to receive a graphical selection of the fourth region by the user on the display, wherein the processor is configured to select the second component from the plurality of components in response to the graphical selection of the fourth region, wherein the processor is configured to receive a value for an animation variable associated with the second component from the user, wherein the processor is configured to modify the animation variable of the second component in response to the value, and wherein the processor is configured to modify the second region to form an updated second region. In various embodiments, the display is also configured to display an updated two-dimensional representation of the three-dimensional object; wherein the updated two-dimensional representation includes the updated second region.

According to one aspect of the invention, a computer program product for a computer system including a processor and display is disclosed. The computer program product may include code that directs the processor to display a two-dimensional representation of a three-dimensional object on a display, wherein the two-dimensional representation comprises a plurality of two-dimensional regions, wherein the three-dimensional object is associated with a plurality of components in a component hierarchy, and wherein each two-dimensional region is associated with at least one component from the plurality of components. Additionally, the product include code that directs the processor to receive a selection of a two-dimensional region from the user on the display, code that directs the processor to determine a component from the plurality of components associated with the two-dimensional region, and code that directs the processor to receive a value for an animation variable associated with the component. Code that directs the processor to set the animation variable associated with the component to the value may also be included. The codes typically reside on a tangible media such as a magnetic media, optical media, semiconductor media, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 2:
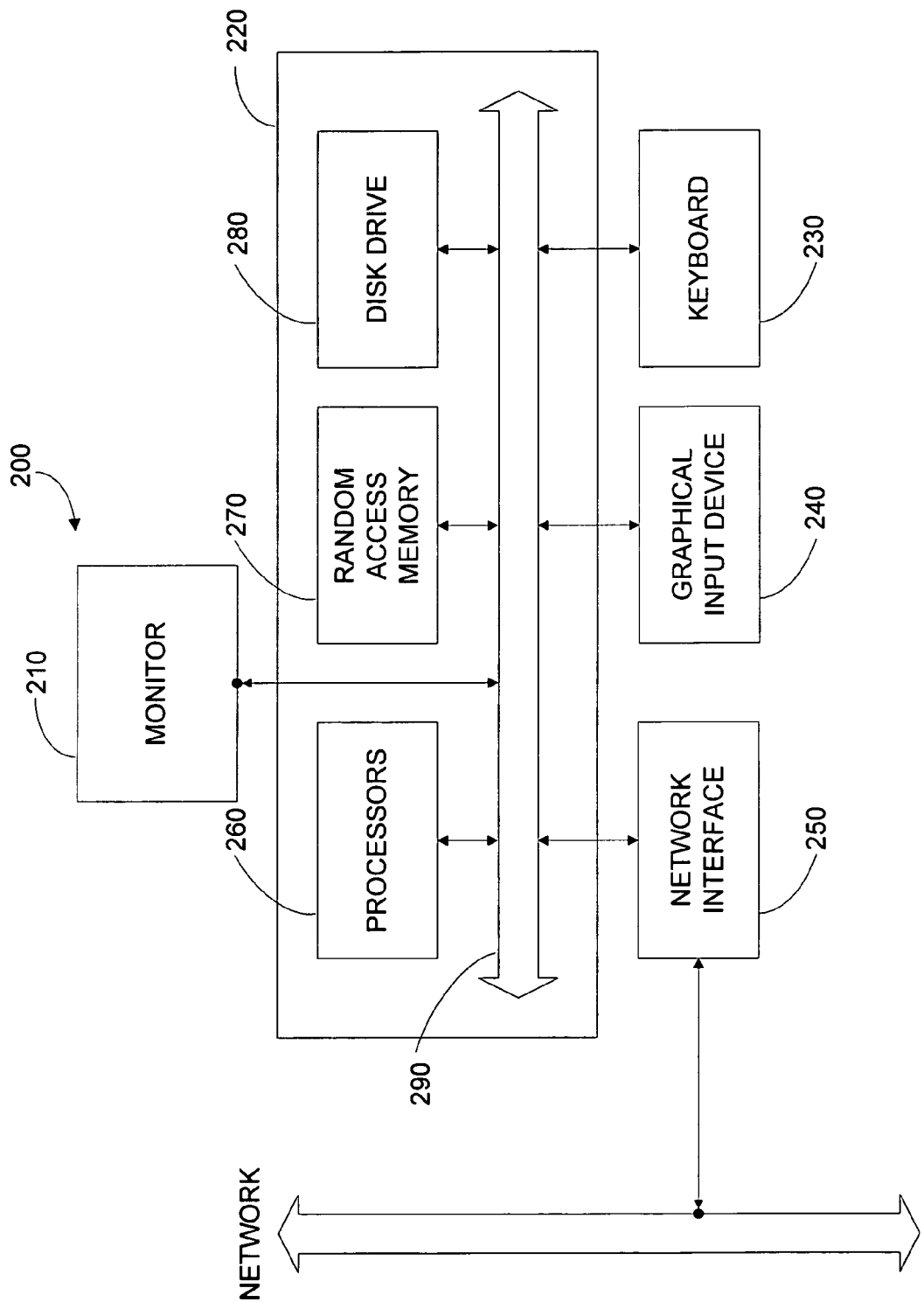
FIG. 2 is a block diagram of typical computer system according embodiments of the present invention.

FIG. 2 is a block diagram of typical computer system 200 according to an embodiment of the present invention.

In the present embodiment, computer system 200 typically includes a monitor 210, computer 220, a keyboard 230, a user input device 240, a network interface 250, and the like.

In the present embodiment, user input device 240 is typically embodied as a computer mouse, a trackball, a track pad, a joystick, wireless remote, drawing tablet, an integrated display and tablet (e.g. Cintiq by Wacom), voice command system, eye tracking system, and the like. User input device 240 typically allows a user to select objects, icons, text and the like that appear on the monitor 210 via a command such as a click of a button or the like.

Embodiments of network interface 250 typically include an Ethernet card, a modem (telephone, satellite, cable, ISDN), (asynchronous) digital subscriber line (DSL) unit, and the like. Network interface 250 are typically coupled to a computer network as shown. In other embodiments, network interface 250 may be physically integrated on the motherboard of computer 220, may be a software program, such as soft DSL, or the like.

Computer 220 typically includes familiar computer components such as a processor 260, and memory storage devices, such as a random access memory (RAM) 270, disk drives 280, and system bus 290 interconnecting the above components.

In one embodiment, computer 220 is a PC compatible computer having one or more microprocessors such as PentiumIV™ or Xeon™ microprocessors from Intel Corporation. Further, in the present embodiment, computer 220 typically includes a LINUX-based operating system.

RAM 270 and disk drive 280 are examples of tangible media configured to store data, audio/video files, computer programs, scene descriptor files, object models, object components, mapping of specified components to groups of components, animation variables, shader descriptors, different component hierarchies for one or more objects, output image files, texture maps, displacement maps, object creation environments, animation environments, asset management systems, databases and database management systems, and the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 200 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Further, the use of other micro processors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows®, WindowsXP®, WindowsNT®, or the like from Microsoft Corporation, Solaris from Sun Microsystems, LINUX, UNIX, MAC OS from Apple Computer Corporation, and the like.

Figure 3:
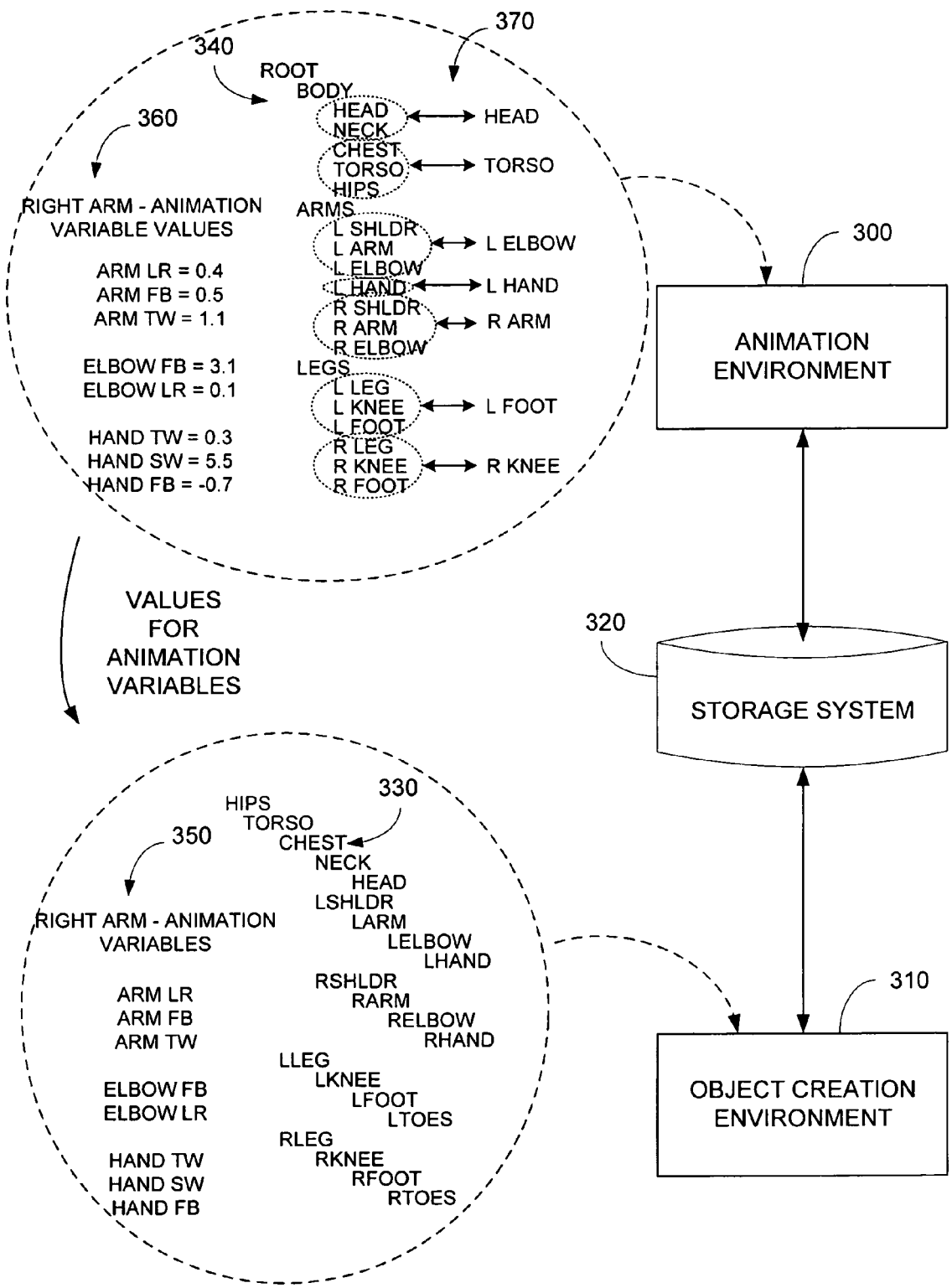
FIG. 3 illustrates a block diagram of an embodiment of the present invention.

FIG. 3 illustrates a block diagram of an embodiment of the present invention. Specifically, FIG. 3 illustrates an animation environment 300, an object creation environment 310, and a storage system 320.

In the present embodiment, object creation environment 310 is an environment that allows users (modelers) to specify object articulation models, including armatures and rigs. Within this environment, users can create models (manually, procedurally, etc.) of other objects (components), and specify how the objects articulate with respect to animation variables (Avars). In one specific embodiment, object creation environment 310 is a Pixar proprietary object creation environment known as "Geppetto." In other embodiments, other types of object creation environments can be used.

In the present embodiment, the object models that are created with object creation environment 310 may be used in animation environment 300. Typically, object models are heirarchically built, and the user (modeler) specifies how the components are interconnected via an object hierarchy 330. The heirarchical nature for building-up object models is useful because different users (modellers) are typically assigned the tasks of creating the different models. For example, one modeller is assigned the task of creating a hand model, a different modeller is assigned the task of creating a lower arm model, and the like. Accordingly, by dividing-up the responsibility for object creation, the object creation process time is greatly reduced.

In the present embodiment, animation environment 300 is an environment that allows users (animators) to manipulate object articulation models, via setting of animation variables (Avars). In one embodiment, animation environment 300 is a Pixar proprietary animation environment known as "Menv," although in other embodiments, other animation environments could also be adapted. In this embodiment, animation environment 300 allows an animator to manipulate the Avars provided in the object models (generic rigs) and to move the objects with respect to time, i.e. animate an object.

Additionally, in the present embodiment, animation environment 300 supports the use of an object hierarchy, that may be different from the heirarchy used by the object modelers. For example, within animation environment 300 an object hierarchy 340 may specify the direct connection between components not directly connected in object hierarchy 330. Also shown is a logical mapping 370 between specified components and groups of components.

In other embodiments of the present invention, animation environment 300 and object creation environment 310 may be combined into a single integrated environment.

In FIG. 3, storage system 320 may include any organized and repeatable way to access object articulation models. For example, in one embodiment, storage system 320 includes a simple flat-directory structure on local drive or network drive; in other embodiments, storage system 320 may be an asset management system or a database access system tied to a database, or the like. In one embodiment, storage system 320 receives references to object models from animation environment 300 and object creation environment 310. In return, storage system 320 provides the object model stored therein. As illustrated, object models typically specify one or more animation variables 350. In response, via animation environment 300, the user may specify values 360 for animation variables 350 either graphically, via keyboard, or the like.

Figure 4A:
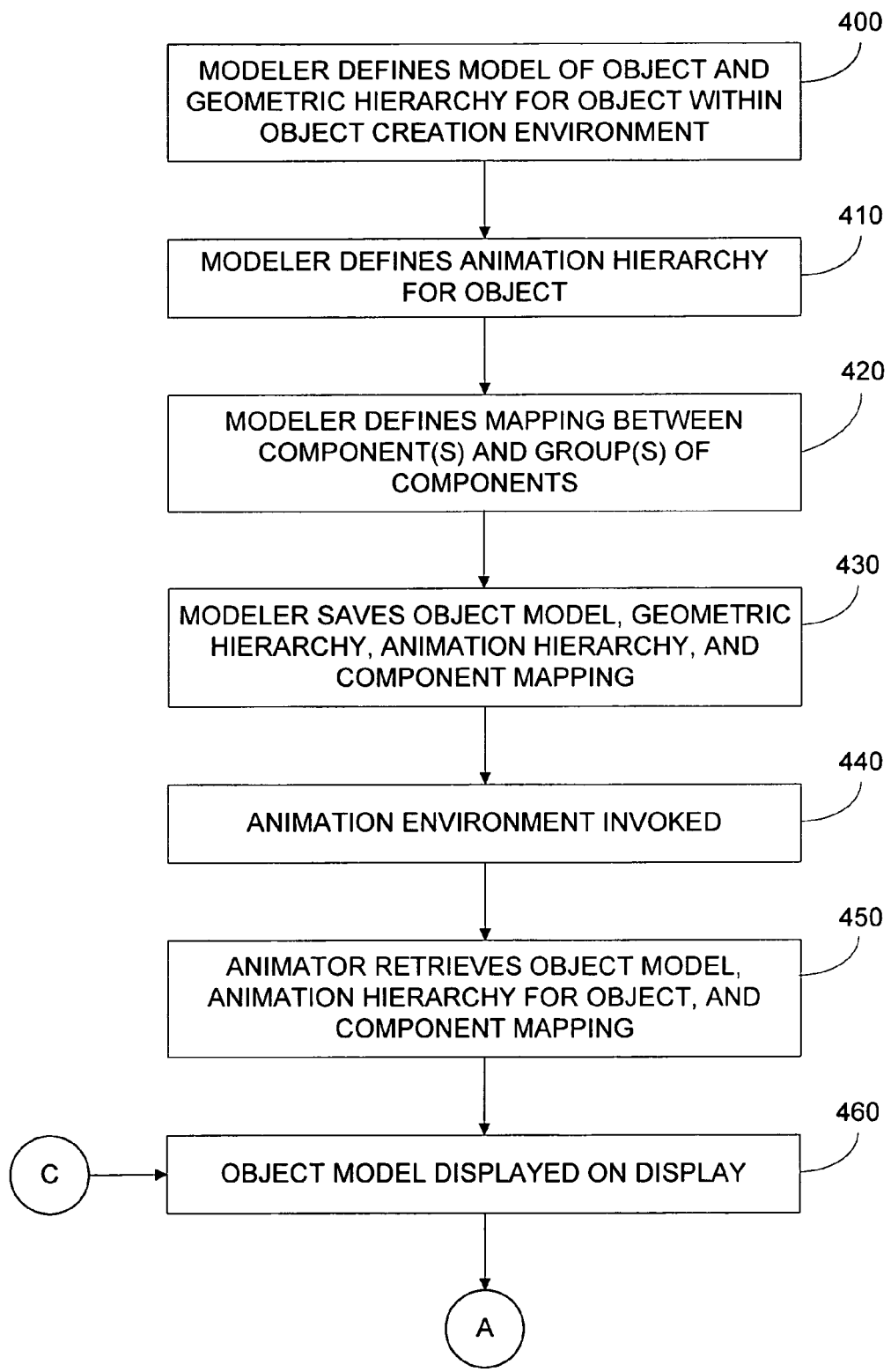
FIGS. 4A–C illustrate a block diagram of a flow process according to an embodiment of the present invention.
Figure 4B:
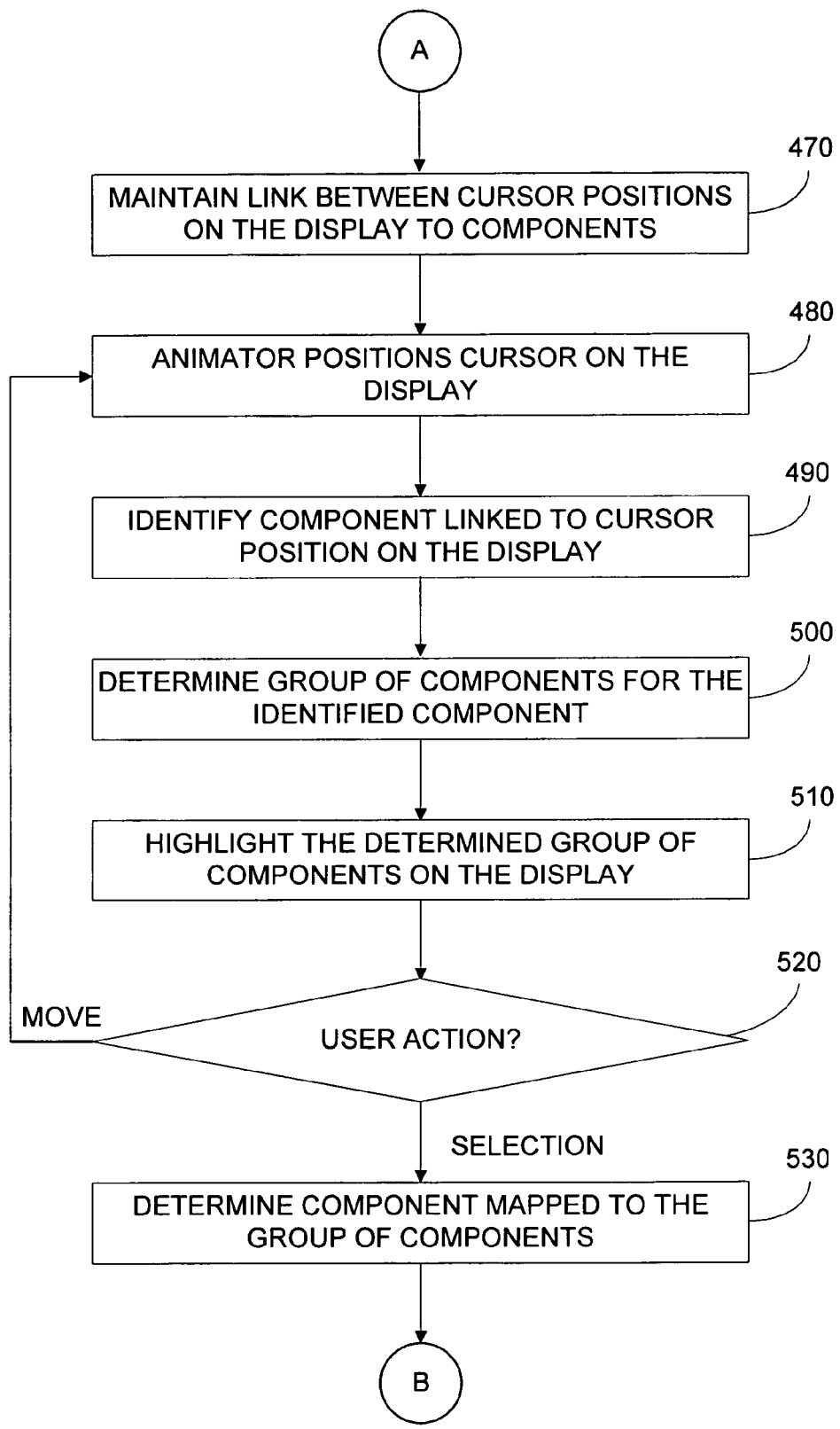
Figure 4C:
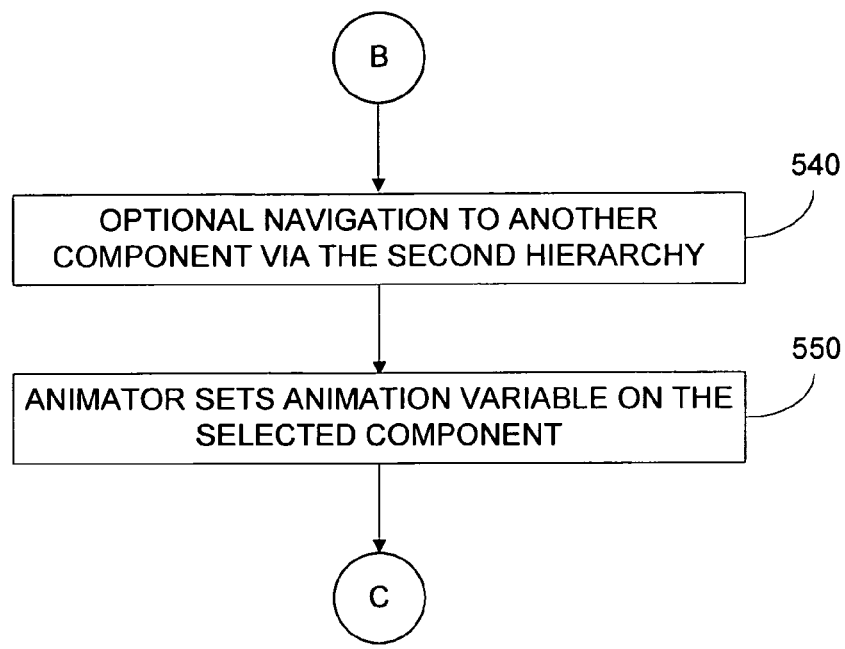

FIGS. 4A–B illustrate a block diagram of a flow process according to an embodiment of the present invention.

Initially, one or more users (e.g. object modelers) creates a model of a three-dimensional object, step 400 in an object creation environment. The specification of the model typically includes a specification of sub-objects or components, interconnected in a first connection hierarchy. Additionally, the user defines animation variables applicable to the components.

Next, in the present embodiment, the user (e.g. object modeler) also defines a second connection hierarchy for the components of the object, step 410. In various embodiments of the present invention, a different user (e.g. an animator, a shader) specifies the interconnections in the second connection hierarchy. The object modeler then implements the second connection hierarchy. In various embodiments, any number of connection hierarchies may be created for different users and for different uses, for example, types of hierarchies may include a deformer hierarchy, a shading hierarchy, a geometric hierarchy, a animation hierarchy, and the like. In embodiments of the present invention, the different users may directly define the second connection hierarchy, and/or may define the hierarchy on-the-fly (i.e. add interconnections between the components as needed).

In various embodiments, the second connection hierarchy may include the first connection hierarchy and include additional interconnections. In other embodiments, the second connection hierarchy may include only some, or even none, of the same interconnections as the first connection hierarchy.

In the present embodiment, the user (e.g. object modeler) also defines a mapping from selected components to one or more components (group of components), step 420. For example, one mapping may be between a right arm component and a group of components including: the right arm, the right shoulder, and right elbow; another mapping may be between a head component, and a group of components including: the head component, a group of components including a neck component, a manipulation component; yet another mapping may be between a torso component and a group of components including: the torso component, the hips component, and the chest component, and the like.

In various embodiments of the present invention, different users (e.g. an animator, a shader) specify the mappings, and the object modeler then implements the mappings. In various embodiments, mappings between a component and one or more components may be created for different users and for different uses. In other embodiments of the present invention, the different users may directly define the mappings and/or may define the mappings on-the-fly (i.e. define a mapping as needed). Examples of this will be given below.

In the present embodiments, the model of the three-dimensional object, the first connection hierarchy and the second connection hierarchy, and at least one mapping between components and other components are then saved, step 430.

In embodiments of the present invention, it is contemplated that a first class of users (e.g. object modelers) define a model, implement the custom connection hierarchies, and implement the mapping between components; and different class of users (e.g. animators, shaders) use the custom connection hierarchies and the mapping.

In the example in FIG. 4A, a user (e.g. animator) initiates an animation environment, step 440, and retrieves the object model, the second connection hierarchy, and the mapping, step 450. In other embodiments, the object model, second connection hierarchy, and the mapping may be retrieved within the object creation environment, a shading environment, or the like.

In the present embodiment, when the object model is retrieved into the animation environment, the object is displayed to the user on a display, step 460. The object may be represented on the display in a number of ways including an armature mode that illustrates the underlying "skeleton" of the object. Another way includes a wire-frame mode that illustrates the armature and surface of the object as a series of wire-frames. Yet another way includes a rendered mode that simply renders the surface of the object. In the animation environment, the rendering process includes converting geometric descriptions of the physical components of the object into a two-dimensional representation on the display. In embodiments of the present invention, a user (e.g. animator) can easily switch between the different appearances of the object within animation environment.

In embodiments of the present embodiment, when the object is displayed, the animation environment maintains a link between the two-dimensional output on the display and components in the second connection hierarchy, step 470. More particularly, the animation environment maintains a link between two-dimensional regions on the display and components of the three-dimensional object. For example, the animation environment will know for a particular view of the object, pixel x1,y1 on the display represents a surface of a rendered head, pixel x2,y2 on the display represents a surface of a rendered torso, pixel x3,y3 on the display represents a surface associated with an eye tracking component, and the like.

In the present embodiment, a user then positions a cursor on the display, step 480. The user may perform this action in any number of conventional ways, such as with a mouse, drawing pen, track ball, voice command or the like. In response to the cursor position on the display, and the link discussed in step 470, the animation system identifies the linked component, step 490. Using the example above, if the cursor is on pixel x1,y1 on the display, the animation environment identifies the head component; if the cursor is on pixel x2,y2 on the display, the animation environment identifies the torso component; if the cursor is on pixel x3,y3 on the display, the animation environment identifies the eye tracking component, and the like.

Next, the animation system determines to which group of components the identified component belongs, step 500. More particularly, the animation system determines which group of components, defined in step 420, above, includes the identified component. Using the example above, the head component would be identified as part of the group of components including the head component, a neck component, and a manipulation component; a torso component would be identified as part of the group of components including the torso component, the hips component, and the chest component; and the like.

In the present embodiment, two-dimensional regions on the display associated with components from the group of components may be highlighted on the display, step 510. To the user, the effect is to highlight components that belong to the same group, as the user moves the cursor on the display. For example, as the cursor is positioned on top of a two-dimensional region associated with any of: the torso component, the hips component, or the chest component, all of the associated two-dimensional regions will be highlighted. In various embodiments, highlighting may including displaying the two-dimensional regions in a different color, outlining the two-dimensional region or regions, or other visual indication, and the like. Examples of this will be illustrated below. In addition, audio cues can also be output to the user. For example, as a different group of components are highlighted, a sound may be output to the user. As another example, the sound may have a different pitch as different groups of components are highlighted. As still another example, when the cursor is positioned on top of the head component, the user may hear "head;" when the cursor is positioned on top of the eye tracker component, the user may hear "eye tracker component;" when the group of components including a torso component is highlighted, the user may hear "torso group;" and the like. In still other embodiments, force feedback devices may also be integrated. For example, as a new group of components is highlighted, a mouse, or the like may vibrate. Many other ways to provide sensory feedback are contemplated and are included in alternative embodiments.

In embodiments, if the user continues to reposition the cursor on the display, the process discussed above may be repeated, step 520. In various embodiments, the process may result in the same group of components being highlighted, or a different group of components being highlighted. As one example, if the cursor is moved from a two-dimensional region associated with a torso component to a two-dimensional region associated with a chest component, the same group of components are highlighted. As another example, if the cursor is moved from a two-dimensional region associated with a torso component, to a two-dimensional component associated with a head component, the group of components including the torso, hips, and chest component is first highlighted, and the group of components including the head, neck, and manipulation component is then highlighted.

In various embodiments, the user may make a selection of the highlighted two-dimensional regions on the display, step 520. In some embodiments, the user may click a mouse button, tap a button a stylus, strike a key on a keyboard, make a voice command, or the like.

In response to the user selection, the animation system refers to the mapping defined in step 420 to determine which specified component the group of components is mapped, step 530. As discussed above, the mapping maps between the groups of components to a selected component. Using the example described above, if the group of components including the right arm, the right shoulder, and right elbow was highlighted (step 510), and selected (step 520), the animation system refers to the mapping and determines that the right arm is selected. As another example, if the groups of components including the head, the neck, and a manipulation component was highlighted and selected, the head component is selected according to the mapping. Examples of this will be illustrated below.

In embodiments of the present invention, after the component selection above, the user may navigate to other components using a variety of techniques, step 540. For example, the user may navigate referring to the first connection hierarchy or the second connection hierarchy. In some embodiments, the user may use techniques described in the "Pickwalking" application, referred-to above to easily navigate the component hierarchy using an animator connection hierarchy, or the like.

Once the component is selected, the user manipulates one or more animation variables associated with the component, step 550. In various embodiments, the animation variables may be manipulated through the entry of numeric values in a table, through graphical user interface, direct-manipulation techniques pioneered by Pixar, or the like. In various embodiments, the animation variables may be associated with physical components, manipulation components, or the like of the three-dimensional model.

In the present embodiment, in response to the changed animation variables, the geometric description of the object typically changes, and the object is re-rendered and displayed. The process above is then repeated.

Figure 5A:
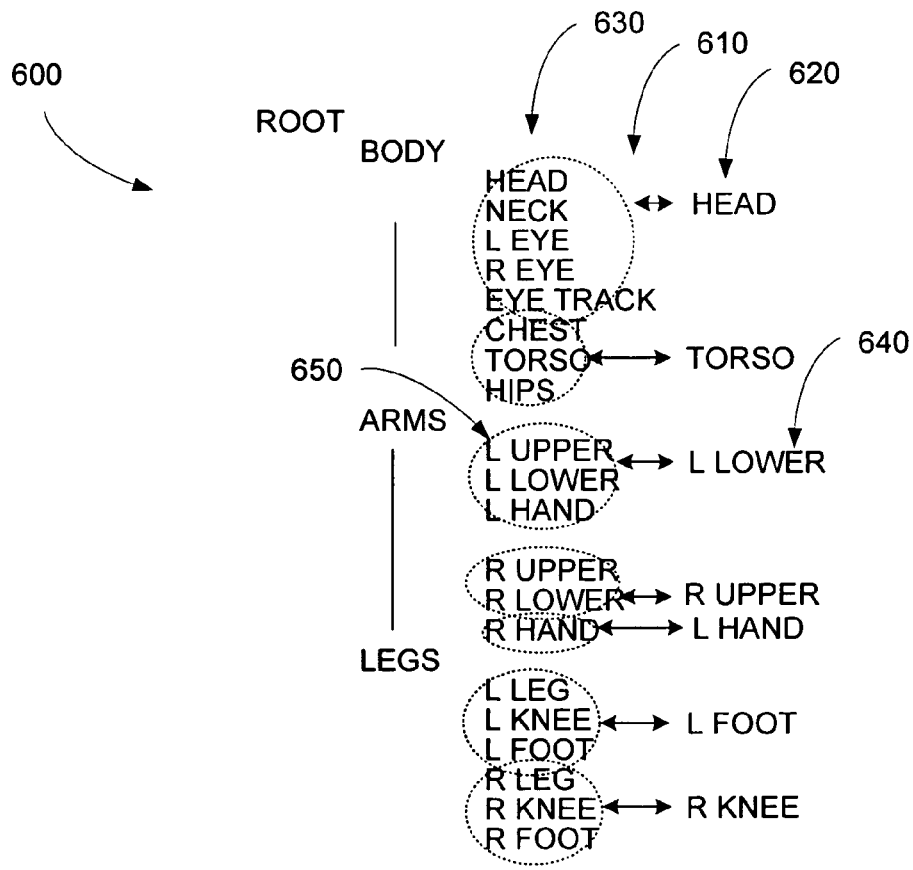
FIG. 5A–G illustrate embodiments according to an embodiment of the present invention.

FIGS. 5A–G illustrate examples according to embodiments of the present invention. In the example of FIG. 5A illustrates an a component hierarchy 600 provided for an animator is illustrated. As shown, a mapping 610 is also illustrated that maps particular components 620 to groups of components 630. For example, a left lower arm component, 640 is mapped to a group 650 including a left lower arm component, a left upper arm component, and a left hand component.

Figure 5B:
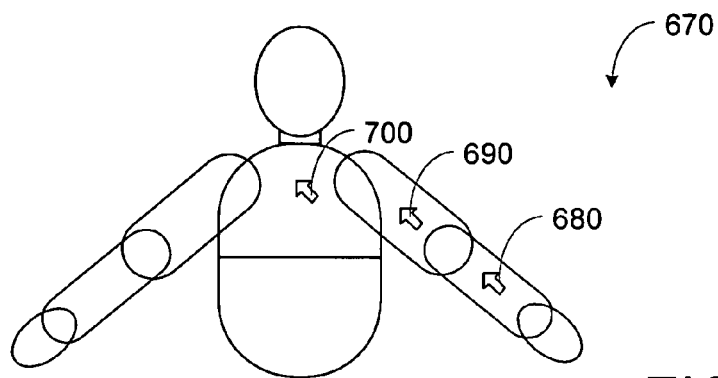

FIG. 5B illustrates a display 670 of a portion of a three-dimensional object (person) displayed to a user (e.g. animator). In the following examples, a number of cursor positions are illustrated including position 680, 690, and 700.

Figure 5C:
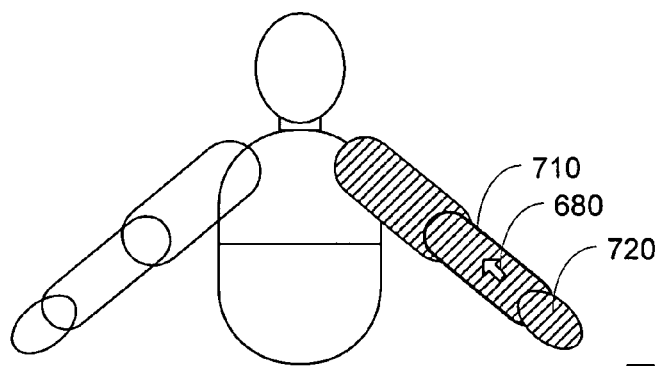

In the example in FIG. 5C, a cursor is positioned on position 680 on display 670. According to an embodiment described above, the animation system first determines what component position 680 is linked to (step 490). In this example, the component is the left lower arm 710. As further described in the embodiments above, the animation determines that left lower arm 710 belongs to component group 650, as shown in FIG. 5A (step 540). The components belonging to component group 650 are then highlighted 720 on the display (step 510).

Figure 5D:
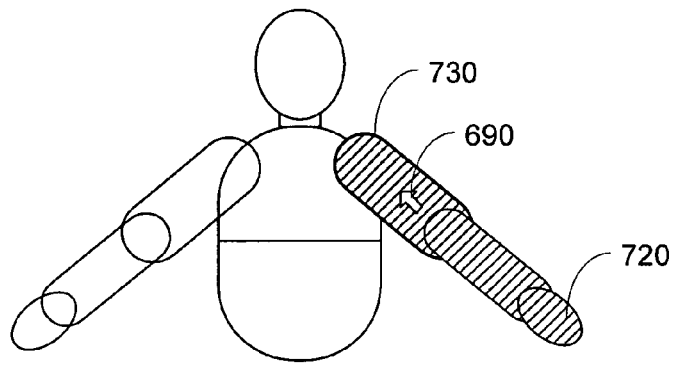

In the example in FIG. 5D, the cursor has been repositioned to position 690. In this example, position 690 is linked to the left upper arm 730, and left upper arm 730 is also mapped to component group 650. Accordingly, the components in component group 650 remain highlighted 720 on the display.

Figure 5E:
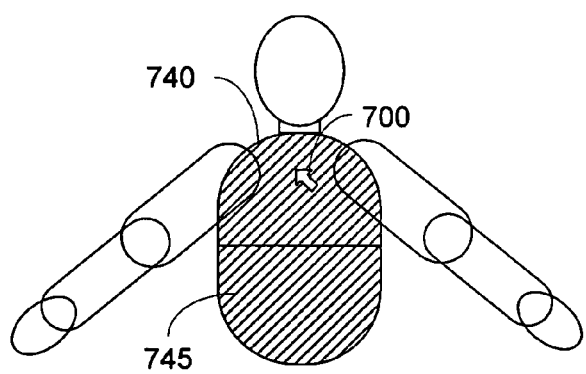

In the example in FIG. 5E, the cursor has been repositioned to position 700. In this example, position 700 is linked to the chest 740, and chest 740 is mapped to a component group including a chest component, torso component, and hips component in FIG. 5A. In FIG. 5E, these components are then highlighted 745 on the display.

Figure 5F:
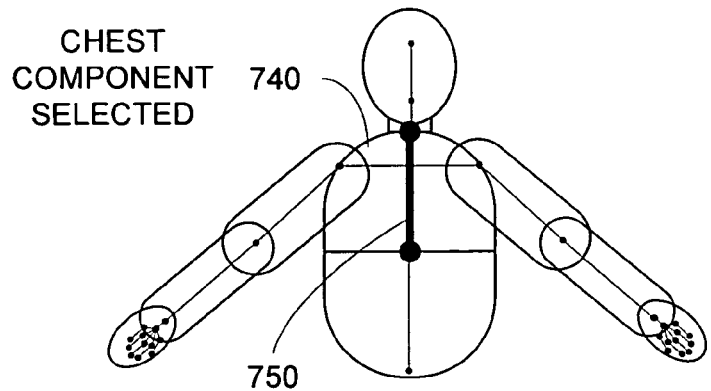

Continuing the example, in FIG. 5F, the user selects the group of components highlighted. In the present example, when the user makes a selection while the component group is highlighted 745, the animation system determines that chest component is selected, per the mapping 610. Accordingly, as shown in FIG. 5F, the armature 750 of chest component 740 is then highlighted.

Figure 5G:
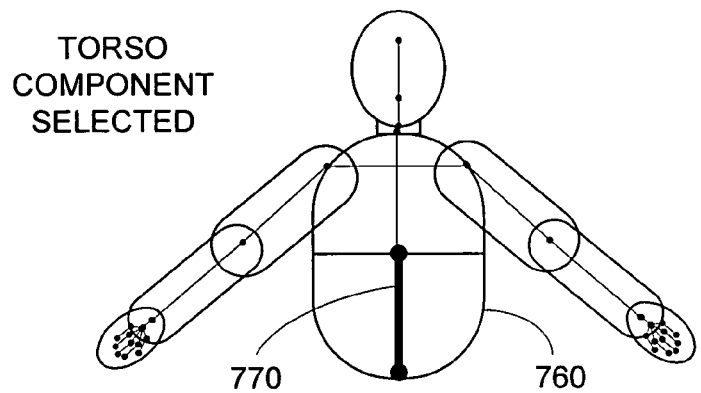

In the example in FIG. 5G, the user makes one or more hierarchy navigation commands to select different components of the three-dimensional object. In this example, the user may hit a "down" arrow key on the keyboard to select torso component 760. As shown, the armature 770 of torso component is then highlighted. Subsequently, the user may modify one or more animation variables of torso component 760.

Figure 6A:
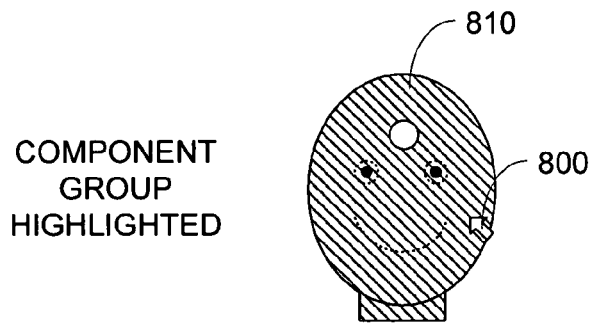
FIG. 6A–C illustrate embodiments according to an embodiment of the present invention.
Figure 6B:
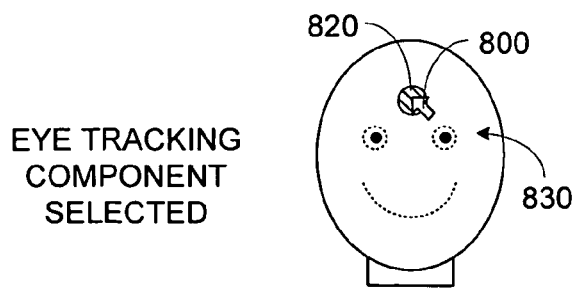
Figure 6C:

FIGS. 6A–C illustrate examples of embodiments of the present invention. In FIG. 6A, a cursor 800 is positioned such that a group of components 810 is highlighted. In FIG. 6B, the user repositions cursor 810 to another location 820 on the display. In the present embodiment, location 820 is associated with a manipulation component. One such manipulation component is as an eye-tracking component. Specifically, when the user selects the eye tracking component, animation variables specifying the location on the screen where the eyes 830 will point to can be set. As illustrated, in various embodiments, components belonging to a first group (eye components 830) may be manipulated from a selection of a second component (eye tracking component).

In various embodiments, the animation system may automatically enter different manipulation modes in response to selection of specific components. For example, as shown in FIG. 6B, selection of the eye-tracking component may cause the animation system to automatically enter a "translate mode" so that eyes 830 will "track" a user-defined location 840 in space. Other types of manipulation modes or components are also contemplated.

Figure 1A:
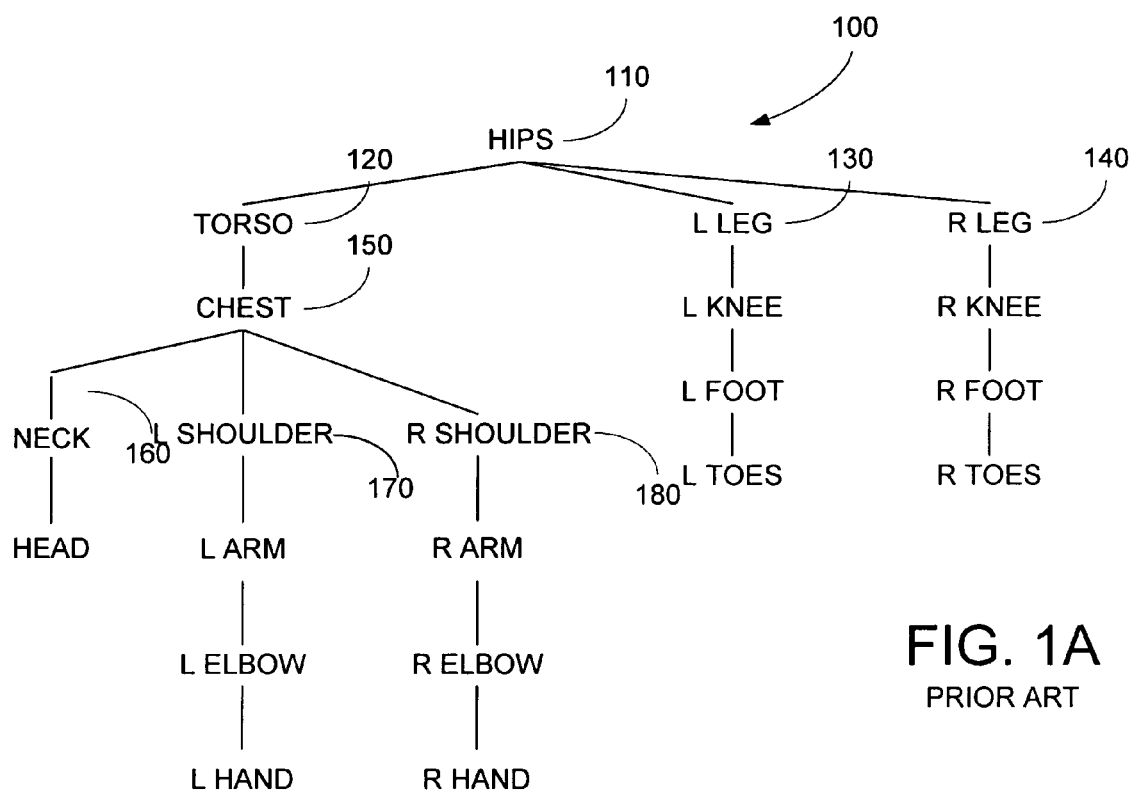
FIG. 1A–B illustrate a typical object hierarchy.
Figure 1B:
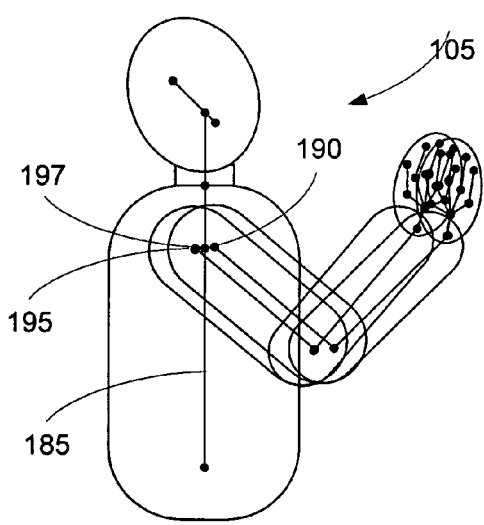

FIGS. 7A–D illustrate additional examples of embodiments of the present invention. In FIG. 7A–D, the same view of the three-dimensional object shown in FIG. 1B is shown.

Figure 7A:
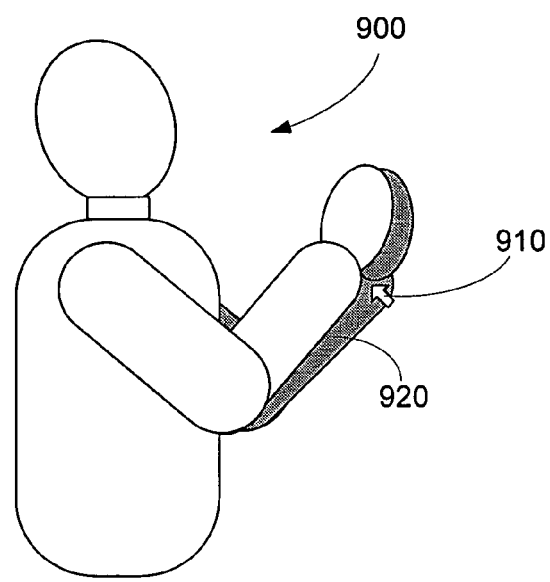
FIG. 7A–D illustrate embodiments according to an embodiment of the present invention.
Figure 7B:
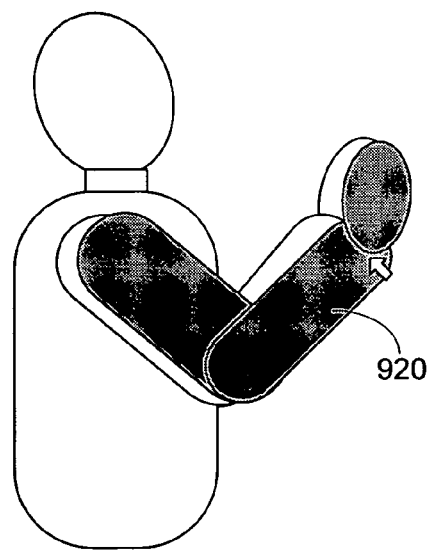

In FIG. 7A, the surfaces of a three-dimensional object 900 are shown. Using the process described above, the cursor 910 is positioned as shown. In response to the position of cursor 910 on the display, a group of components is highlighted 920 on the display. FIG. 7B illustrates an alternative embodiment of the same group of components highlighted 930 on the display. In this embodiment, as different groups of components are highlighted, they are visually brought to the "front."

Figure 7C:
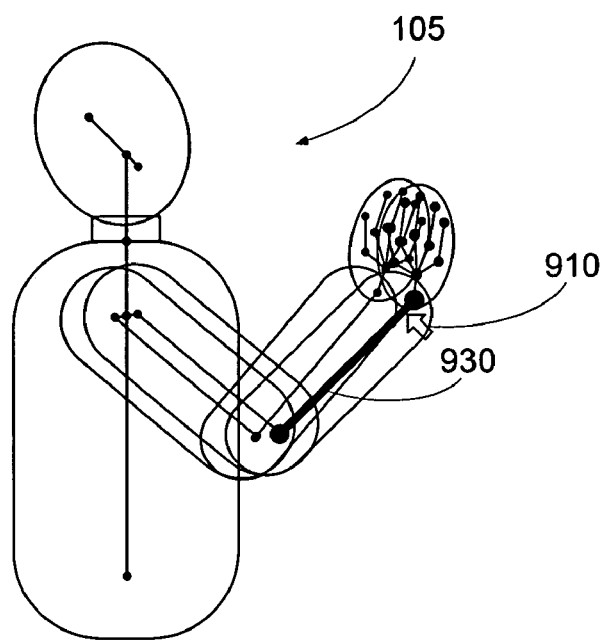
Figure 7D:
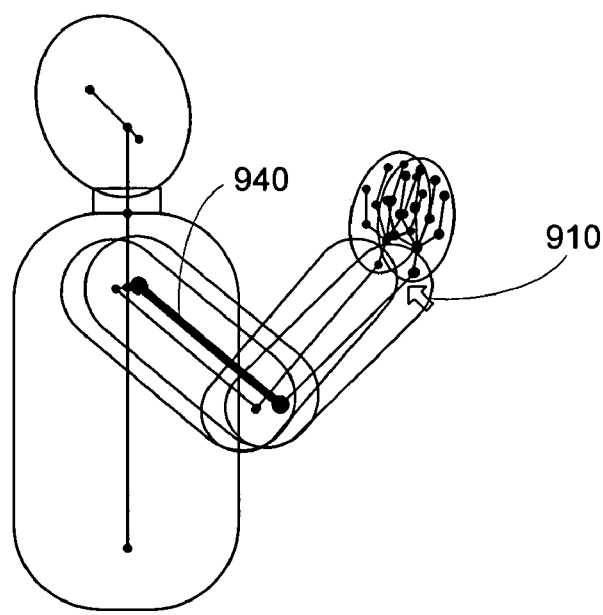

In FIG. 7C, the user has selected the highlighted group on components on the display. As shown, in response to the selection, in various embodiments, the "skeleton" of three-dimensional object is displayed, and the specified component 930 mapped to the group of components is selected. Next, using hierarchy navigation techniques, the user simply selects the left upper arm component 940.

As can be seen, the embodiments illustrated above provide a simpler method for the users to select specific components of a three-dimensional object via selection of surfaces (or patches) of an object.

Many changes or modifications are readily envisioned. In light of the above disclosure, one of ordinary skill in the art would recognize that more than one component may be selected when a highlighted group of components is selected. Additionally, other "non-geometric" components may have user pickable patches displayed on the display. For example, a bend component or a squash and stretch component may also appear as pickable locations on the surface of the object, or the like. In other embodiments, gestures, keyboards commands, and the like may also be used to select objects on the display In embodiments of the present invention, techniques may be implemented in any number of object system, such as an animation environment, object creation environment, and the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system including a display comprises:

displaying a two-dimensional representation of a three-dimensional object on the display; wherein the three-dimensional object comprises a plurality of components in a component hierarchy, wherein the two-dimensional representation comprises a plurality of two-dimensional regions including a first region, a second region, a third region, and a fourth region, wherein a fourth region comprises the second region and the third region, wherein the first region comprises a two-dimensional representation of a first component from the plurality of components, wherein the second region comprises a two-dimensional representation of a second component from the plurality of components, and wherein the third region comprises a two-dimensional representation of a third component from the plurality of components;

receiving a graphical selection of the fourth region by a user on the display;

selecting the second component from the plurality of components in response to the graphical selection of the fourth region;

receiving a value for an animation variable associated with the second component from the user;

modifying the animation variable of the second component in response to the value;

modifying the second region to form an updated second region; and displaying an updated two-dimensional representation of the three-dimensional object on the display wherein the updated two-dimensional representation includes the updated second region.

2. The method of claim 1 wherein selecting the second component from the plurality of components in response to the graphical selection further comprises visually indicating the second region was selected although the animation variable associated with the second component is not modified.

3. The method of claim of claim 2 wherein visually indicating the second region was selected comprises highlighting the second region on the display.

4. The method of claim 1 wherein the two-dimensional representation also includes a fifth region;

wherein the plurality of components includes a manipulation component in the component hierarchy;

wherein the fifth region is associated with a manipulation component; and wherein the method further comprises:

receiving a graphical selection of the fifth region by the user on the display;

selecting the first component from the plurality of components in response to the graphical selection of the fifth region;

receiving a value for an animation variable associated with the manipulation component from the user;

modifying the animation variable of the first component in response to the value;

modifying the first region to form an updated first region; and displaying a further updated two-dimensional representation of the three-dimensional object on the display, wherein the updated two-dimensional representation includes the updated second region and the updated first region.

5. The method of claim of 4
wherein the first region represents an eye;
wherein the manipulation component comprises an eye-tracking component;
wherein receiving a value for the animation variable comprises determining a point in space where the eye should point; and
wherein the updated first region comprises a two-dimensional representation of an eye tracking the point in space.

6. The method of claim 1 further comprising:
receiving a graphical selection of the first region by the user on the display;
selecting the first component from the plurality of components in response to the graphical selection of the fourth region;
receiving a value for an animation variable associated with the first component from the user;
modifying the animation variable of the first component in response to the value; and
modifying the first region to form an updated first region; and
displaying a further updated two-dimensional representation of the three-dimensional object on the display, wherein the updated two-dimensional representation includes the updated second region and the updated first region.

7. The method of claim 1 further comprising:
receiving a keyboard navigation command from the user;
selecting the third component from the plurality of components in response to the keyboard navigation command.

8. A computer program product for a computer system including a processor comprises:
code that directs the processor to display a two-dimensional representation of a three-dimensional object on a display, wherein the two-dimensional representation comprises a plurality of two-dimensional regions, wherein the three-dimensional object is associated with a plurality of components in a component hierarchy, and wherein each two-dimensional region is associated with at least one component from the plurality of components;
code that directs the processor to receive a selection of a two-dimensional region from a user on the display;
code that directs the processor to determine a component from the plurality of components associated with the two-dimensional region;
code that directs the processor to receive a value for an animation variable associated with the component; and
code that directs the processor to set the animation variable associated with the component to the value;
wherein the codes reside on a tangible media.

9. The computer program product of claim 8
wherein the component from the plurality of components comprises least a first component;
wherein the two-dimensional representation comprises a first two-dimensional region;
wherein the two-dimensional region is associated with the first component and a second component from the plurality of components in the component hierarchy.

10. The computer program product of claim 8 wherein the tangible media further comprises:
code that directs the processor to display an updated two-dimensional representation of the three-dimensional object on the display, wherein the updated two-dimensional representation includes an updated two-dimensional region, and wherein the updated two-dimensional region is determined in response to the component having the animation variable set to the value.

11. The computer program product of claim 10 wherein the tangible media further comprises:
code that directs the processor to determine a position of a cursor on the display;
code that directs the processor to determine a current two-dimensional region from the plurality of two-dimensional regions associated with the position of the cursor on the display; and
code that directs the processor to visually indicate the current two-dimensional region on the display although animation variables associated therewith are not modified.

12. The computer program product of claim 9 wherein the first component is selected from the group: a three-dimensional component of the three-dimensional object in the component hierarchy, a manipulation component associated with the tree-dimensional object in the component hierarchy.

13. The computer program product of claim 9 wherein the first component comprises a manipulation mode associated with the three-dimensional object in the component hierarchy and associated with a three-dimensional component of the three-dimensional object.

14. A computer system comprises
a memory configured to store a model of a three-dimensional object, wherein the first three-dimensional object comprises a plurality of interconnected components as specified in a component hierarchy, and wherein the plurality of interconnected components includes a first component, a second component, and a third component;
a display configured to display a two-dimensional representation of the three-dimensional object wherein the two-dimensional representation comprises a plurality of two-dimensional regions including a first region, a second region, and a third region, and a fourth region, wherein a fourth region comprises the second region and the third region, wherein the first region comprises a two-dimensional representation of a first component from the plurality of interconnected components, wherein the second region comprises a two-dimensional representation of a second component from the plurality of interconnected components, and wherein the third region comprises a two-dimensional representation of a third component from the plurality of interconnected components;
a processor coupled to the memory, wherein the processor is configured to receive a graphical selection of the fourth region by a user on the display, wherein the processor is configured to select the second component from the plurality of components in response to the graphical selection of the fourth region, wherein the processor is configured to receive a value for an animation variable associated with the second component from the user, wherein the processor is configured to modify the animation variable of the second component in response to the value, and wherein the processor is configured to modify the second region to form an updated second region; and
wherein the display is also configured to display an updated two-dimensional representation of the three-dimensional object; wherein the updated two-dimensional representation includes the updated second region.

15. The computer system of claim 14 wherein the processor is also configured to determine if a cursor is positioned on top of the first region on the display, and wherein the processor is configured to highlight the first region on the display when the cursor is positioned on top of the first region on the display.

16. The computer system of claim 15 wherein the processor is also configured to determine if the cursor is positioned on top of the second region on the display, wherein the processor is configured to determine if the cursor is positioned on top of the third region on the display, and wherein the processor is configured to highlight the fourth region on the display when the cursor is positioned on top of either the second region on the display or the third region on the display.

17. The computer system of claim 16 wherein the processor is also configured to direct output of a sound when the fourth region on the display is highlighted.

18. The computer system of claim 16 wherein the processor is also configured to direct output of a first sound when the first region on the display is highlighted, and wherein the processor is also configured to direct output of a second sound when the first region on the display is highlighted.

19. The computer system of claim 14 wherein the processor also configured to receive a hierarchy navigation signal from the user, and wherein the processor is configured to navigate within the component hierarchy in response to the hierarchy navigation signal.

20. The computer system of claim 19 wherein navigating within the component hierarchy comprises selecting the third component.

* * * * *